United States Patent
Nakamura et al.

(10) Patent No.: US 6,879,815 B2
(45) Date of Patent: Apr. 12, 2005

(54) APPARATUS FOR EXTRACTING A CARRIER FREQUENCY

(75) Inventors: Manabu Nakamura, Tokyo (JP); Kazuo Akaike, Hamura (JP)

(73) Assignee: Hitachi Kokusai Electric Inc., Tokyo (JP)

(*) Notice: Subject to any disclaimer, the term of this patent is extended or adjusted under 35 U.S.C. 154(b) by 447 days.

(21) Appl. No.: 10/207,857

(22) Filed: Jul. 31, 2002

(65) Prior Publication Data
US 2003/0045255 A1 Mar. 6, 2003

(30) Foreign Application Priority Data
Aug. 29, 2001 (JP) ........................................ 2001-259785

(51) Int. Cl.[7] .................................................. H04B 1/18
(52) U.S. Cl. ............................... 455/192.2; 455/192.3; 455/205; 455/313; 375/326
(58) Field of Search ............................. 455/192.2, 192.3, 455/227, 234.1, 119, 205, 216, 313, 17; 375/226, 324; 329/302, 315, 306.323, 346

(56) References Cited

U.S. PATENT DOCUMENTS

| | | | | |
|---|---|---|---|---|
| 3,835,404 A | * | 9/1974 | Nakamura et al. | 375/326 |
| 4,097,813 A | * | 6/1978 | Otani et al. | 375/326 |
| 4,308,503 A | * | 12/1981 | Scott | 329/308 |
| 4,890,302 A | * | 12/1989 | Muilwijk | 375/325 |
| 5,388,125 A | * | 2/1995 | Toda et al. | 455/192.2 |
| 6,018,556 A | * | 1/2000 | Janesch et al. | 375/376 |
| 6,072,842 A | * | 6/2000 | Janesch et al. | 375/326 |
| 6,081,559 A | * | 6/2000 | Leclerc et al. | 375/326 |
| 6,707,863 B1 | * | 3/2004 | Mrozek et al. | 375/327 |

* cited by examiner

Primary Examiner—Sonny Trinh
(74) Attorney, Agent, or Firm—Bacon & Thomas PLLC

(57) ABSTRACT

A frequency extractor extracts an input frequency of an input signal. The frequency extractor includes a frequency multiplier, first and second filters, a binary circuit and a frequency divider. The frequency multiplier obtains a signal of a multiplied frequency, the multiplied frequency being N times the input frequency, N being an integer greater than 1. The first filter, having a first bandwidth, filters the signal of the multiplied frequency to provide a first filtered signal. The binary circuit binarizes the first filtered signal to a binary signal. The frequency divider divides the binary signal by a factor of N to provide a divided signal. The second filter, having a second bandwidth, filters the divided signal to generate the input frequency in a form of a continuous wave, wherein the second bandwidth is about 1/N times the first bandwidth.

10 Claims, 11 Drawing Sheets (PIROR ART)

APPARATUS FOR EXTRACTING A CARRIER FREQUENCY

FIELD OF THE INVENTION

The present invention relates to an apparatus for extracting a carrier frequency of a modulated information signal; and, in particular, to a carrier frequency extractor suitable for use in an automatic frequency control circuit employed in a wireless telecommunications system.

DESCRIPTION OF THE PRIOR ART

FIG. 3 represents a schematic block diagram of the wireless telecommunications system, for example, a wireless transceiver. The wireless transceiver includes a transmission circuit 2A, a reception circuit 2B, a circulator 26, a local oscillator 13, a reference oscillator 15 and an antenna 27. The transmission circuit 2A has mixers 23 to 25, amplifiers 20 to 22 and a modulator 19. Likely, the reception circuit 2B has mixers 10 to 12, amplifiers 16 to 18 and a demodulator 14.

Referring to FIG. 3, for transmission, the local oscillator 13 generates a local oscillation signal having a first predetermined frequency based on a reference oscillation signal from the reference oscillator 15 and provides same to the mixers 23 to 25. The amplifier 20 amplifies a modulated information signal from the modulator 19 and provides same to the mixer 23. The mixer 23 mixes the amplified modulated information signal with the local oscillation signal from the local oscillator 13 to produce a first intermediate frequency signal (hereinafter referred to as the "IF signal"). Likewise, the first IF signal is amplified by the amplifier 21 and is converted to a second IF signal having a higher frequency than that of the first IF signal by being mixed with the local oscillation signal at the mixer 24. The second IF signal is amplified by the amplifier 22 and is then converted at the mixer 25 into a transmission frequency signal having a frequency higher than that of the second IF signal by being mixed with the local oscillation signal from the local oscillator 13. The transmission frequency signal is fed to the antenna 27 through the circulator 26 for the transmission thereof.

For reception, the local oscillator 13 generates a local oscillation signal having a second predetermined frequency based on the reference oscillation signal from the reference oscillator 15 and provides same to the mixers 10 to 12. A reception signal received by the antenna 27 is sent to the reception circuit 2B through the circulator 26. The reception signal is converted into a third IF signal having a lower frequency than that of the reception signal by being mixed with the local oscillator signal at the mixer 10. The third IF signal is amplified by the amplifier 16 and is converted into a fourth IF signal having a lower frequency than the third IF signal by being mixed with the local oscillation signal at the mixer 11. The fourth IF signal is amplified by the amplifier 17 and then converted into a fifth IF signal by being mixed with the local oscillation signal at the mixer 12. The fifth IF signal is amplified by the amplifier 18 and then is demodulated to the information signal by the demodulator 14.

A band pass filter BPF, not shown in FIG. 3, can be employed next to each of mixers 10 to 12 and 23 to 25 to remove unnecessary signal components from an output signal thereof.

In the wireless transceiver having such configuration, a deviation can be generated in the carrier frequency of the reception signal because of a possible difference in the local oscillation frequencies at the transmitting and the receiving ends. The deviation of the carrier frequency is reflected on the output signal of the amplifier 18 and the modulated information signal having the deviated carrier frequency is demodulated by the demodulator 14.

When use is made of such phase shift keying (PSK) modulation as a quadrature phase shift keying (QPSK) as the modulation method, the frequency deviation appears as the phase error. This can tremendously increases the bit error rate of the demodulation output. Therefore, if the frequency deviation is large, demodulation may become virtually impossible.

The demodulator 14 has a frequency range allowing proper demodulation (referred to as an allowed demodulation carrier frequency range), which is within about ±1% of a modulation frequency in a synchronous detection circuit which uses the QPSK method. For example, in case of demodulating a low frequency signal having a carrier frequency of 242 kHz, the demodulator 14 can not demodulate the low frequency signal if the deviation is beyond ±2.4 kHz ($\approx$242 kHz×(±0.01)).

Generally, the frequency deviation due to the local oscillator may be partly originated from the deviation in the frequency of the output from the reference oscillator 15, but is mainly affected by the difference between the frequencies of the local oscillation signals at the transmitting and the receiving ends.

For example, in case a radio frequency signal of 36 GHz is converted into an IF signal of 2 GHz by the mixers 10 to 12 at the receiving end and a frequency precision of the reference oscillator 15 is about ±3.0×10$^{-7}$, the maximum frequency deviation rendered at the receiving end becomes ((36−2)GHz×(±3.0×10$^{-7}$))=±10.2 kHz.

Also, if it is assumed that the same frequency deviation is occurred at the transmitting end, the total frequency deviation ΔF of the IF signal outputted from the mixer 12 can be as large as ΔF=±10.2 kHz×2=±20.4 kHz.

Therefore, the large frequency deviation ΔF of ±20.4 kHz in the output signal from the mixer 12 is to be adjusted to fall within the allowed demodulation carrier frequency range ±2.4 kHz of the demodulator 14. Accordingly, the reception circuit of a conventional wireless transceiver is equipped with an automatic frequency control (AFC) circuit which detects the amount of deviation of the carrier frequency inputted to the demodulator 14 and provides the mixer 12 with a local oscillation signal having a frequency adjusted as much as the detected frequency deviation.

Referring to FIG. 4, there is illustrated a block diagram of a conventional reception circuit of a transceiver incorporating therein an AFC circuit 28 capable of digitally detecting a deviation in a carrier frequency. The reception circuit includes an antenna 27, mixers 10 and 11, local oscillators 17a and 17b, a demodulator 14 and the AFC circuit 28, which has a carrier frequency extractor 29, a frequency counter 30, a central processing unit (CPU) 31 and a synthesizer 32. Like parts appearing in both FIGS. 3 and 4 are designated by like reference numerals and detailed explanation thereof will be omitted.

The AFC circuit 28 receives an input signal (modulated information signal at IF frequency band) to the demodulator 14 and provides the mixer 12 with a local oscillation signal having a frequency modified as much as a frequency deviation ΔF in the input signal. Thus, the carrier frequency of the IF modulated information signal provided from the mixer 12 to the demodulator 14 can be within the allowed demodulation carrier frequency range of the demodulator 14.

The carrier frequency extractor 29 in the AFC circuit 28 receives the output signal of the mixer 12 and extracts a carrier thereof to regulate a wave form of the extracted carrier and then generates a pulse signal having a frequency identical to that of the extracted carrier. The pulse signal is provided to the frequency counter 30. The frequency counter 30 counts the number of pulses per a predetermined time interval. At the end of each time interval, the counting is terminated, and the frequency counter 30 retains a count value $F_N$ and simultaneously sends an interrupt command (IR) to the CPU 31. The CPU 31, responsive to the IR, reads the count value $F_N$ retained in the frequency counter 30 and detects a frequency deviation ΔF of the carrier frequency extracted by the carrier frequency extractor 29. Then, the CPU 31 generates a set value Ns corresponding to the detected frequency deviation ΔF and then sets the set value Ns at the synthesizer 32. Based on the set value Ns, the synthesizer 32 generates the local oscillation signal having a frequency modified as much as the frequency deviation ΔF and then provides same to the mixer 12.

As described above, since the carrier frequency deviation ΔF is detected through a digital circuit using the frequency counter 30 and CPU 31, the detection precision is not affected by the change of ambient temperature. And also, even if the carrier frequency deviation ΔF is very large, the AFC circuit 28 can precisely correct the carrier frequency to fall within the allowed demodulation carrier frequency range of the demodulator 14.

Also, even though the signal reception is interrupted, e.g., by any obstacles, the set value Ns is maintained at the synthesizer 32 and the local oscillation signal provided to the mixer 12 from the synthesizer 32 still maintains the frequency corresponding to the set value Ns. Therefore, when the signal interruption is ended, the frequency control can be rapidly resumed.

Hereinafter, it is assumed that an IF frequency of output signal from each mixer 10 to 12 is the same as that exemplary shown in FIG. 4 and the allowed demodulation carrier frequency range of the demodulator 14 is ±1 kHz.

FIG. 5 shows a schematic block diagram of the synthesizer 32. The synthesizer 32 includes a reference oscillator 40, phase comparators 41 and 49, low pass filters LPF 42, 47 and 51, voltage controlled oscillators (VCO) 43 and 44, an amplifier 45, 48 and 52, a mixer 46 and a direct digital synthesizer (DDS) 50.

In FIG. 5, the VCO 43, the phase comparator 41 and LPF 42 constitute a phase lock loop (PLL). The PLL generates a stable signal of 439.5 MHz from the VCO 43 based on a stable output signal of the reference oscillator 40. The output signal of the VCO 43 is appropriately divided by a frequency divider (not shown) and then provided to the phase comparator 41.

An output signal with a center frequency of 439.3 MHz from the VCO 44 is amplified by the amplifier 45 and then is mixed with the output signal of 439.5 MHz from the VCO 43 by the mixer 46. Unnecessary components of the mixed output signal from the mixer 46 are filtered out by the LPF 47. A frequency $f_0$ of the output signal from the LPF 47 is as follows:

$$f_0 = 439.5 \text{ MHz} \pm n \times (439.3 \text{ MHz} + \Delta F')$$

$$\begin{cases} +, \text{ if } f_0 > 439.5 \text{ MHz} \\ -, \text{ if } f_0 < 439.5 \text{ MHz,} \end{cases}$$

wherein the n is a positive integer and ΔF' is a frequency deviation from the center frequency of the output signal of the VCO 44.

Assuming that $f_0$<439.5 MHz with n=1, the frequency $f_0$ which is the frequency difference between the output signals from the VCOs 43 and 44 is as follows:

$$f_0 = 439.5 \text{ MHz} - (439.3 \text{ MHz} + \Delta F')$$

$$= 200 \text{ kHz} - \Delta F'.$$

The above output signal from the LPF 47 is provided to the phase comparator 49 after being amplified by the amplifier 48.

In the meantime, if the frequency deviation of the carrier frequency extracted by the carrier frequency extractor 29 is ΔF, the CPU 31 sets the set value Ns of 200 kHz−ΔF at the DDS 50. The DDS 50 outputs a signal having a frequency of 200 kHz−ΔF to the phase comparator 49. Specifically, the DDS 50 stores a digitized sinusoidal wave data form and generates a signal having a frequency corresponding to the set value $N_s$ by repeatedly reading the stored wave data at a speed corresponding to the set value $N_s$. This signal is converted into an analog signal by a D/A converter (not shown) and is then outputted to the phase comparator 49.

The phase comparator 49 compares the output of the amplifier 48 with the output signal of the DDS 50 to thereby output a voltage corresponding to the frequency difference of (ΔF−ΔF') therebetween. The voltage from the phase comparator 49 is provided to the VCO 44 as a frequency control voltage after being filtered by the LPF 51. The VCO 44 controls a local oscillation signal so as to be changed as much as the frequency difference ΔF−ΔF' and outputs the signal with the following frequency:

$$439.3 \text{ MHz} + \Delta F' + (\Delta F - \Delta F') = 439.3 \text{ MHz} + \Delta F.$$

The output signal from the VCO 44 is provided to the mixer 12 shown in FIG. 4 as the local oscillation signal after being amplified by the amplifier 52.

FIG. 6 is a flow chart showing a detailed example of the operation of the CPU 31.

At the onset of the operation at step 100, the CPU 31 sets a set value $N_s$ of 200 kHz+$\Delta F_{BFR}$ to the DDS 50, wherein $\Delta F_{BFR}$ is a set deviation value. The set deviation $\Delta F_{BFR}$ is initially set to be 0 assuming that there exists no frequency deviation at the beginning of the operation. This set deviation $\Delta F_{BFR}$ is maintained at the CPU 31. At step 101, the CPU 31 sets a variable N representing a deviation detecting number as 0 and waits for the IR from the frequency counter 30.

At step 102, the frequency counter 30 begins a counting immediately or shortly after the beginning of the signal reception because the reception signal may not be stable at the beginning. The frequency counter 30 retains a count value $F_N$ counted during the predetermined time interval, e.g., 100 ms, and outputs an IR to the CPU 31. Receiving the IR from the frequency counter 30, the CPU 31 reads the count value $F_N$ from the frequency counter 30 (step 103); and then calculates a frequency difference Δ$F_N$ between the carrier frequency of the modulated signal inputted to the demodulator 14, i.e., carrier frequency having no frequency deviation, e.g., 10.7 MHz and the count value $F_N$, as follows; $\Delta F_N = F_N − 10.7$ MHz (step 104).

Next, at step 105, the CPU 31 compares an absolute value |Δ$F_N$| of the frequency difference Δ$F_N$ with a predetermined frequency 22.5 kHz. If |Δ$F_N$| is larger than 22.5 kHz, |Δ$F_N$| is disregarded and the procedure returns to step 102. As a result, if |Δ$F_N$| is very large due to the interruption of signal reception, for example, this frequency difference Δ$F_N$ is not used. If $|\Delta F_N|$ is equal to or smaller than 22.5 kHz, the CPU 31 stores the $\Delta F_N$ as the frequency deviation and increases the variable N by 1 (step 106).

At step 107, the variable N is compared with the predetermined value, e.g., 11 and if N is smaller than 11, the procedure returns to step 102, but if N is 11, in other words, if the stored number of frequency deviation $\Delta F_N$ is 10, the procedure goes to step 108.

The predetermined frequency 22.5 kHz used at step 105 is slightly larger than $\Delta F$, e.g., 20.4 kHz, considered as the maximum frequency deviation described above. Therefore, If $|\Delta F_N|$ is larger than the 22.5 kHz, $\Delta F_N$ is regarded as being meaningless and thus is discarded. The carrier frequency extractor 29 and a band-pass filter (not shown) provided next each of the mixers 10 to 12 shown in FIG. 4 can pass therethrough signals deviated greater than the maximum frequency deviation. These signal are removed at step 105.

At step 108, a mean value of thus obtained 10 frequency deviations $\Delta F_1$ to $\Delta F_{10}$ is calculated and is regarded as the frequency deviation $\Delta F$ of the carrier frequency extracted by the carrier frequency extractor 29. At step 109, it is determined whether the frequency deviation $\Delta F$ is within a target frequency range (assumed as being 1 kHz herein), i.e., $|\Delta F| \leq 1$ kHz, wherein the target frequency range, for example, 1 kHz, is set to be narrower than the allowed demodulation frequency range, e.g., about 1% of the carrier frequency, allowing the demodulator 14 to demodulate the carrier. If the frequency deviation $\Delta F$ is within the target frequency range, the procedure returns to step 101. The CPU 31 then waits for a new IR from the frequency counter 30 for starting a new operation for a next time interval. In this case, the set value $N_s$ set to the DDS 50 in the synthesizer 32 is maintained unchanged. That is, since the demodulation can be properly performed by the demodulator 14 in such a case, the local frequency of the oscillation signal generated from the synthesizer 32 is not changed.

On the other hand, if $|\Delta F|>1$ kHz at step 109, the procedure goes to step 110. At step 110, it is checked whether $\Delta F_{BFR}+\Delta F>22.5$ kHz. If $\Delta F_{BFR}+\Delta F>22.5$ kHz, the process proceed to step 101 and such frequency deviation $\Delta F$ is disregarded because in such a case an updated set deviation value ($\Delta F_{BFR}+\Delta F$) causes the IF modulated information signal inputted to the demodulator 14 to deviate beyond ±22.5 kHz. This may occur, even in the case where $|\Delta F| \leq 22.5$ kHz at step 105, if $\Delta F_{BFR}$, by the shift of the carrier frequency due to external disturbances for example.

If it is determined at step 110 that $\Delta F_{BFR}+\Delta F$ is not greater than 22.5 kHz, the set deviation value $\Delta F_{BFR}$ is updated as $\Delta F_{BFR}+\Delta F$ (step 111) and at step 112 new set value $N_s$ of 200 kHz−($\Delta F_{BFR}+\Delta F$) is set to the DDS 50 in the synthesizer 32 and the procedure returns to step 101.

As a result, even if the received signal is interrupted, the local oscillation signal from the synthesizer 32 is not interrupted because the set value $N_s$ set before the interruption is maintained unchanged. Also, after the interruption is ended, a local oscillation signal with a stable frequency can be provided to the mixer 12.

FIG. 7 is a conventional carrier frequency extractor for extracting a carrier frequency of a QPSK modulated signal. The carrier frequency extractor includes a quadruple frequency multiplier 60, a BPF 61 and a binary circuit 62 constructed by a comparator. The carrier frequency extractor is used for extracting a carrier frequency to generate a reference signal for a QPSK demodulator.

In case of employing such a carrier frequency extractor as the one 29 shown in FIG. 4, the multiplier 60 receives the modulated information signal having a carrier frequency of 10.7 MHz+$\Delta F$ from the mixer 12 and multiplies the carrier frequency by 4, to provide a quadrupled frequency of 4×(10.7 MHz+$\Delta F$)=42.8 MHz+4 $\Delta F$. The multiplied output from the frequency multiplier is supplied to the band pass filter 61. The multiplied carrier frequency is binarized by the binary circuit 62 and then provided to the frequency counter 30 shown in FIG. 4.

As described above, if the maximum deviation $\Delta F$ is ±22.5 kHz, the band pass filter 61 is to have a pass band of ±90 kHz (±22.5 kHz×4) with a center frequency of 42.8 MHz in order to detect such frequency deviation.

The output wave form from such band pass filter 61 is rendered as shown in FIG. 8A. The interval Tz indicated by an arrow in FIG. 8A represents a period during which both the I and Q components of the QPSK modulated signal are zero and a phase of the carrier frequency is shifted by 180° before and after the interval Tz.

FIG. 8B shows a binary signal, which is binarized by the binary circuit 62, of the output signal from the band pass filter 61 shown in FIG. 8A. There occurs a loss or dead interval Tdt in the binary signal due to the period Tz shown in FIG. 8A. If the binary signal having the loss interval Tdt is provided to the frequency counter 30, a frequency counting is not performed at the frequency counter 30 during the interval Tdt and, therefore, the frequency deviation $\Delta F$ of the QPSK modulated signal can not be precisely detected.

FIG. 9 represents a frequency spectrum of the quadruply frequency-multiplied QPSK modulated signal. In the drawing, Fc represents a carrier frequency, i.e., 42.8 MHz+4 $\Delta F$; $F_1$ and $F_2$ are baud rate of modulated components; and $BW_1$ and $BW_2$ are pass bands set to the band pass filter 61.

In FIG. 9, in case that the pass band BW1 is broadly set to 42.8 MHz±90 kHz in order to detect the carrier frequency deviated by ±90 kHz, and if the carrier frequency Fc is deviated beyond the above described range, the pass band $BW_1$ may include the baud rate F1 or F2. As a result, the interval Tz appears as in FIG. 8A and thus the loss interval Tdt shown in FIG. 8B is generated during which proper counting operation can not be performed by the frequency counter 30.

In order to prevent the baud rate $F_1$ or $F_2$ from passing through the BPF 61, it is considered to set the pass band BW2 narrower than the pass band BW1 at the BPF 61. In this case, the output of the BPF 61 can be devoid of the interval Tz as well as the loss interval Tdt.

However, if the carrier frequency Fc is deviated beyond the pass band $BW_2$, the carrier frequency Fc can not be detected.

FIG. 10 depicts a vector trace of the output from the BPF 61, wherein the abscissa and the ordinate represent I and Q components of the QPSK modulated signal, respectively.

Pass bandwidths are Fc±20 kHz in FIG. 10A, Fc±30 kHz in FIG. 10B, Fc±40 kHz in FIG. 10C, Fc±60 kHz in FIG. 10D, Fc±75 kHz in FIG. 10E and Fc±90 kHz in FIG. 10F, respectively.

As shown in FIGS. 10A to 10F, the wider is the bandwidth, the larger is a variation range of the vector trace and the closer to zero are more the vectors. In FIG. 10C having the bandwidth Fc±40 kHz, the vector trace is concentrated near the vector zero. And in case that the bandwidth is larger than Fc±60 kHz, a large portion of the vector trace passes the origin (vector=0). The presence of the vector trace passing through the origin means that there appears the interval Tz shown in FIG. 8A in the output signal from the BPF 61.

In order to prevent the period Tz from appearing, the vector trace is to be controlled not to pass through or be concentrated close to the vector zero. For this, the bandwidth (BW) of the BPF 61 may have to be narrower than Fc±30 kHz in the exemplary cases shown in FIGS. 10A to 10F.

SUMMARY OF THE INVENTION

It is, therefore, an object of the present invention to provide a carrier frequency extractor capable of extracting a carrier frequency without a loss period regardless of the amount of deviation in the carrier frequency.

In accordance with the present invention, there is provided a frequency extractor for extracting an input frequency of an input signal, comprising: a frequency multiplier for obtaining a signal of a multiplied frequency, the multiplied frequency being N times the input frequency, N being an integer greater than 1; a first filter, having a first bandwidth, for filtering the signal of the multiplied frequency to provide a first filtered signal; a binary circuit for binarizing the first filtered signal to a binary signal; a frequency divider for dividing the binary signal by a factor of N to provide a divided signal; and, a second filter, having a second bandwidth, for filtering the divided signal to generate the input frequency in a form of a continuous wave, wherein the second bandwidth is about 1/N times the first bandwidth.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
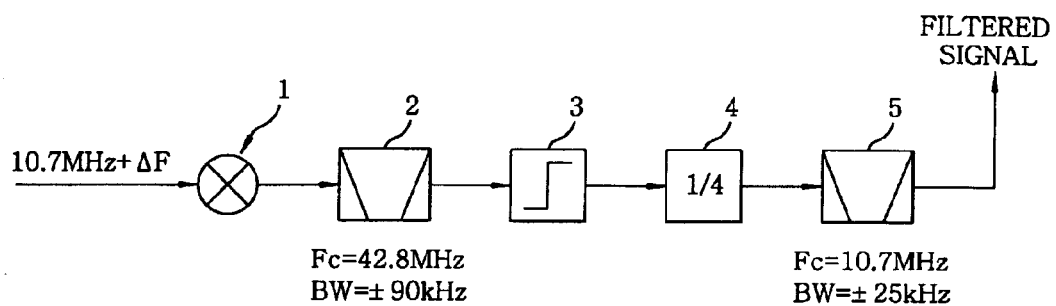
FIG. 1 shows a block diagram of a carrier frequency extractor in accordance with a preferred embodiment of the present invention.

FIG. 1 represents a carrier frequency extractor in accordance with a preferred embodiment of the present invention. The carrier frequency extractor includes a quadruple frequency multiplier 1, a band pass filter (BPF) 2, a binary circuit 3, a frequency divider 4 and a BPF 5.

Figure 7:
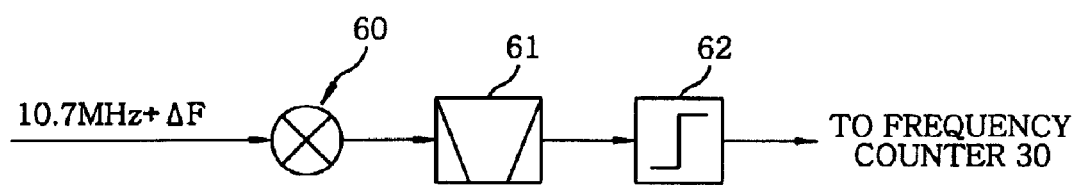
FIG. 7 shows a block diagram of a conventional carrier frequency extractor.

The frequency multiplier 1, the BPF 2 and the binary circuit 3 are identical to those of FIG. 7. The frequency divider 4 which receives as input the output of the binary circuit 3, digitally performs ¼ division of the frequency of the output thereof.

Figure 8A:
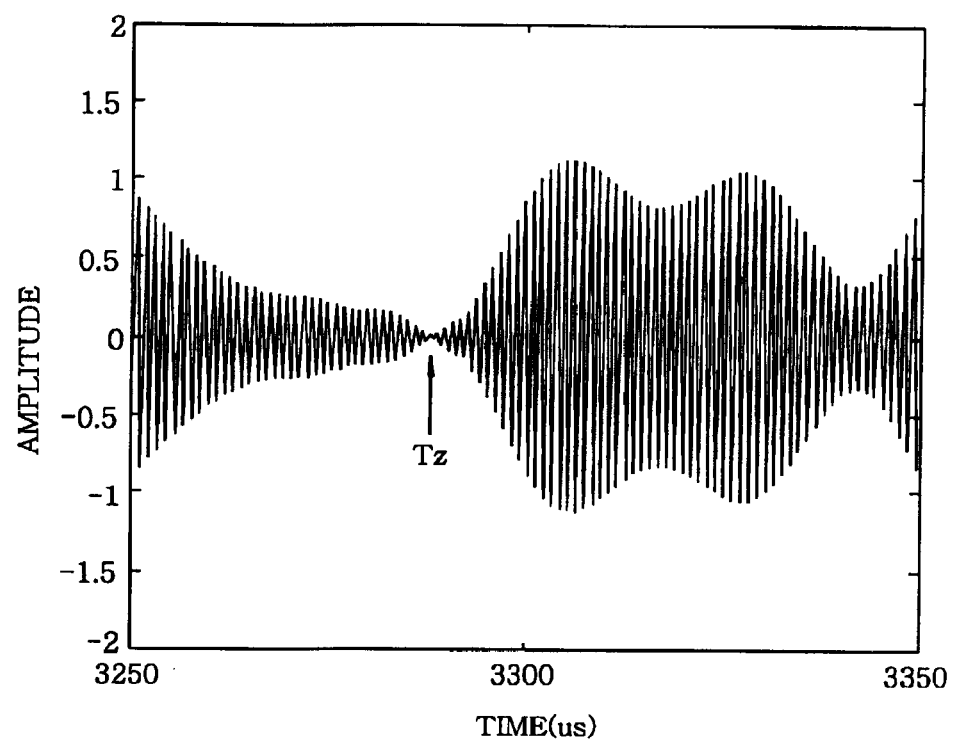
FIG. 8A and FIG. 8B represent a wave of a QPSk modulated signal inputted to the conventional carrier frequency extractor shown in FIG. 7 and a binary signal outputted therefrom, respectively.
Figure 10A:
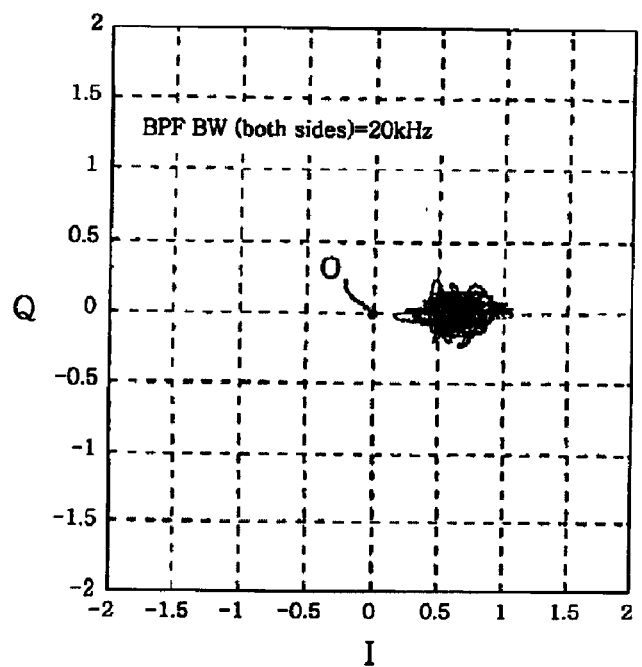
FIG. 10A to FIG. 10F depict vector traces of outputs of a band pass filter shown in FIG. 7 as a function of pass bandwidth.
Figure 10B:
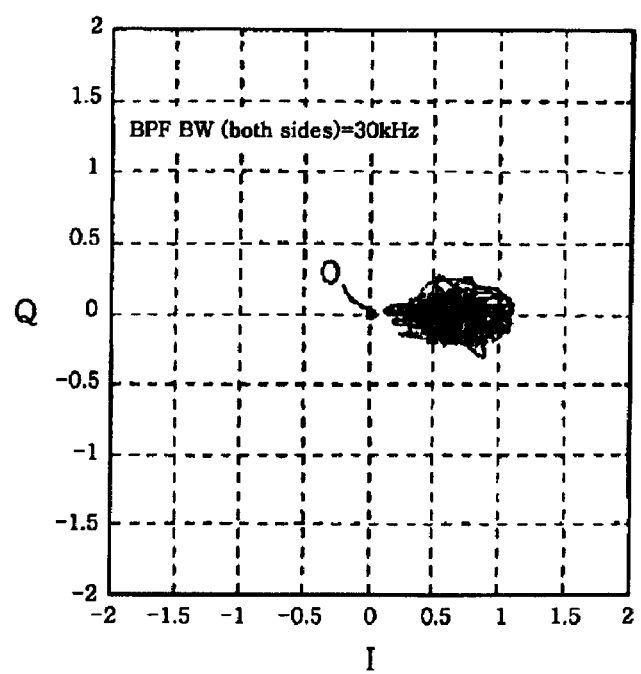
Figure 10C:
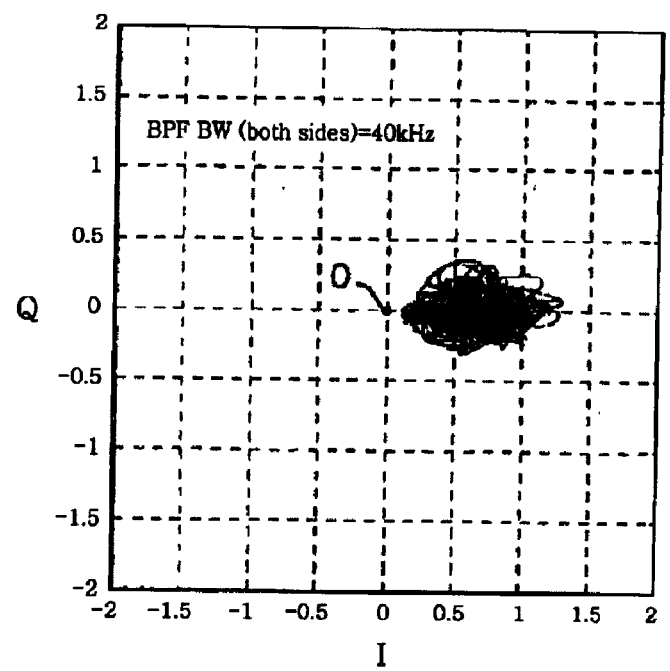
Figure 10D:
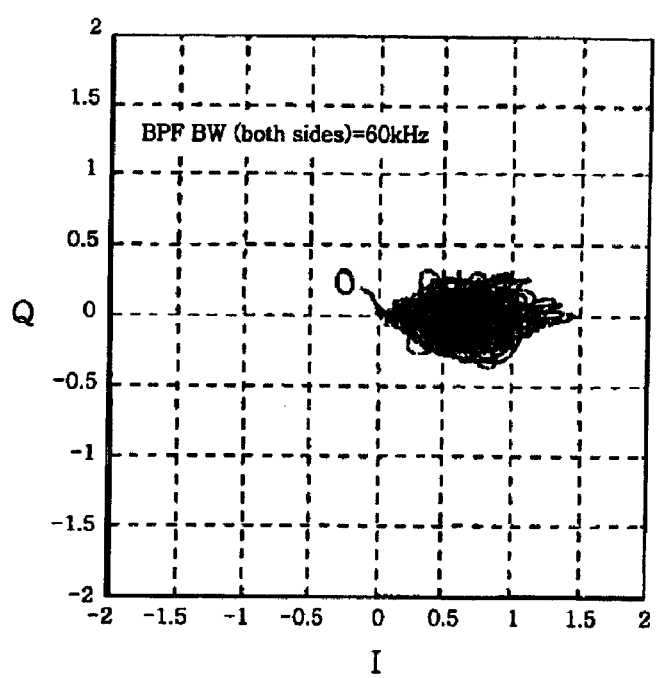
Figure 10E:
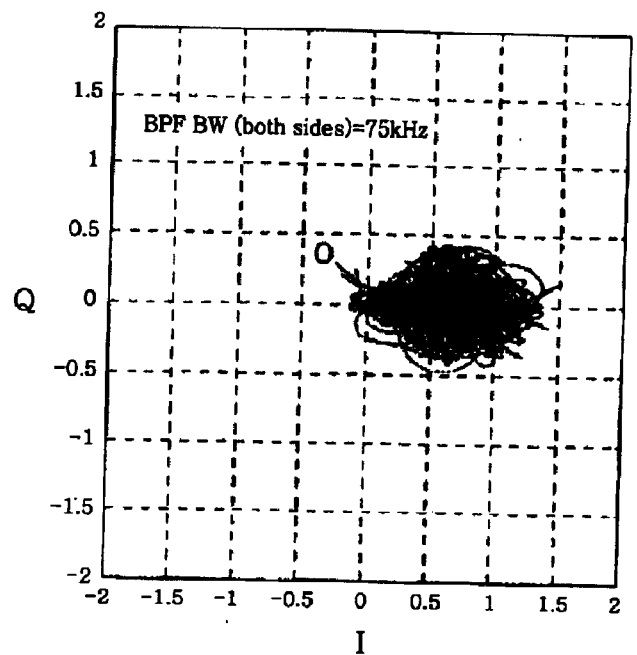
Figure 10F:
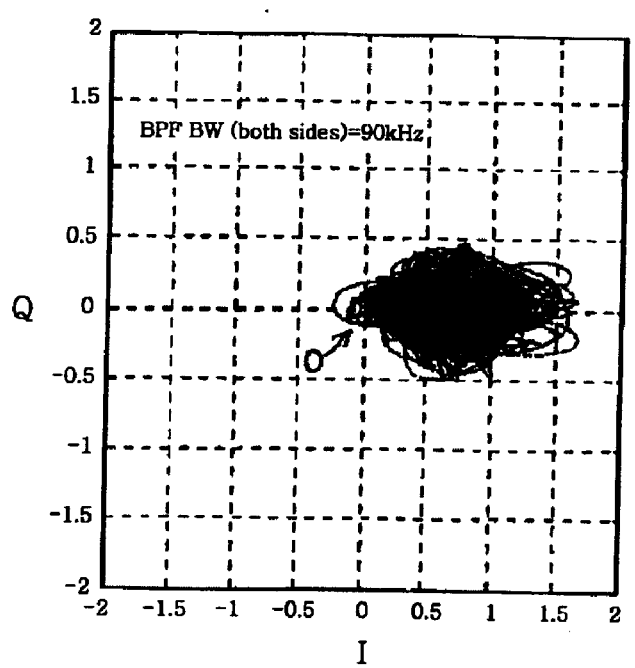

If the carrier frequency Fc of the QPSK modulated signal inputted to the multiplier 1 allowed within the range of 10.7 MHz±22.5 kHz as described in FIG. 7, the bandwidth BW of the BPF 2 is set to be 42.8 MHz±90 kHz, quadruple of the allowed range of Fc. In this case, a vector trace of the output of the BPF 2 appears as shown in FIG. 10F and thus an output wave form of the BPF 2 has the interval Tz as shown in FIG. 8A. Therefore, when the output of the BPF 2 is binarized by the binary circuit 3, the loss interval Tdt corresponding to the interval Tz appears as described in FIG. 8B and also the phase of the output of the binary circuit 3 is shifted by 180° before and after the loss interval Tdt, as in the case of the conventional carrier frequency extractor shown in FIG. 7.

In this embodiment, the output of the binary circuit 3 is digitally divided by a factor of 4 at the frequency divider 4. Therefore, the carrier frequency from the frequency divider 4 becomes 10.7 MHz±22.5 kHz but with a reduced phase shift of 45° (180°/4) before and after the loss interval Tdt.

The output of the frequency divider 4 is provided to the BPF 5. The BPF 5 has a bandwidth of 10.7 MHz±25 kHz, wherein the bandwidth has a center frequency of 10.7 MHz with about a ¼ bandwidth of the BPF 2. Therefore, the BPF 5 can pass a maximum frequency deviation of ±22.5 kHz. If the carrier frequency thus outputted from the frequency divider 4 is provided to the BPF 5, the loss interval Tdt can be avoided by a filter response characteristic. This is because even though the amplitude of the signal is gradually attenuated during the loss interval Tdt, the signal does not completely disappear since the loss interval Tdt is not that long enough. Also, even though a carrier with a phase shift of 45° is inputted to the BPF 5 at the end of the loss interval, the rapid shift change of 45° is absorbed by the mean characteristic and thus the phase is slowly changed to 45°.

Since the phase change of 45° before and after the loss interval Tdt is small enough compared to that, i.e., 180°, of carrier frequency inputted to the frequency divider 4, this phase change is smoothly achieved and thus the carrier frequency is not disturbed.

Figure 2:
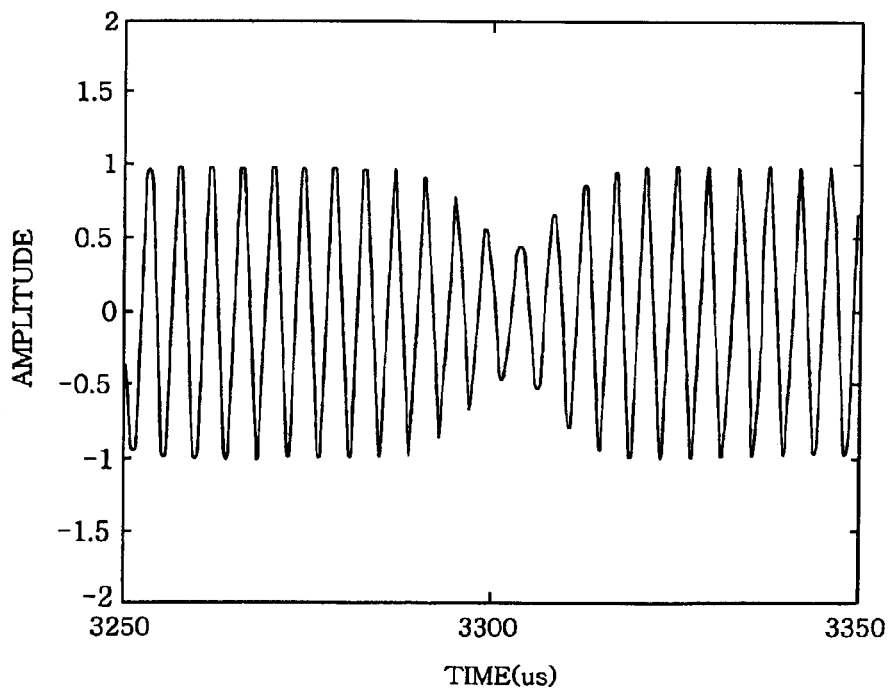
FIG. 2 depicts a wave form of the carrier extracted by the carrier frequency extractor in accordance with the preferred embodiment of the present invention.
Figure 3:
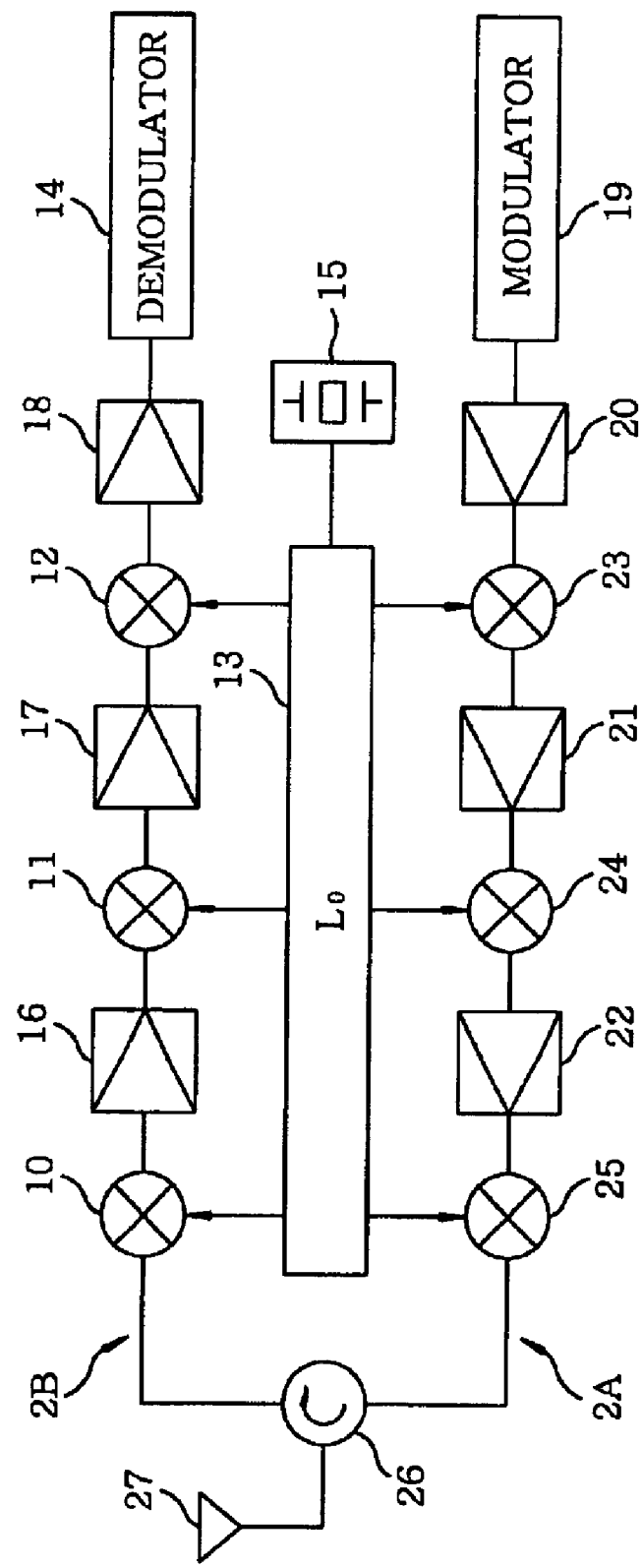
FIG. 3 illustrates a schematic circuit diagram of a transceiver.

By this, even if the QPSK modulated signal having a maximum frequency deviation of ±22.5 kHz is provided to the frequency multiplier 1, a smoothly varying continuous wave form carrying the more precise frequency deviation information can be obtained by the BPF 5 as shown in FIG. 2 without the loss interval Tdt.

Figure 8B:
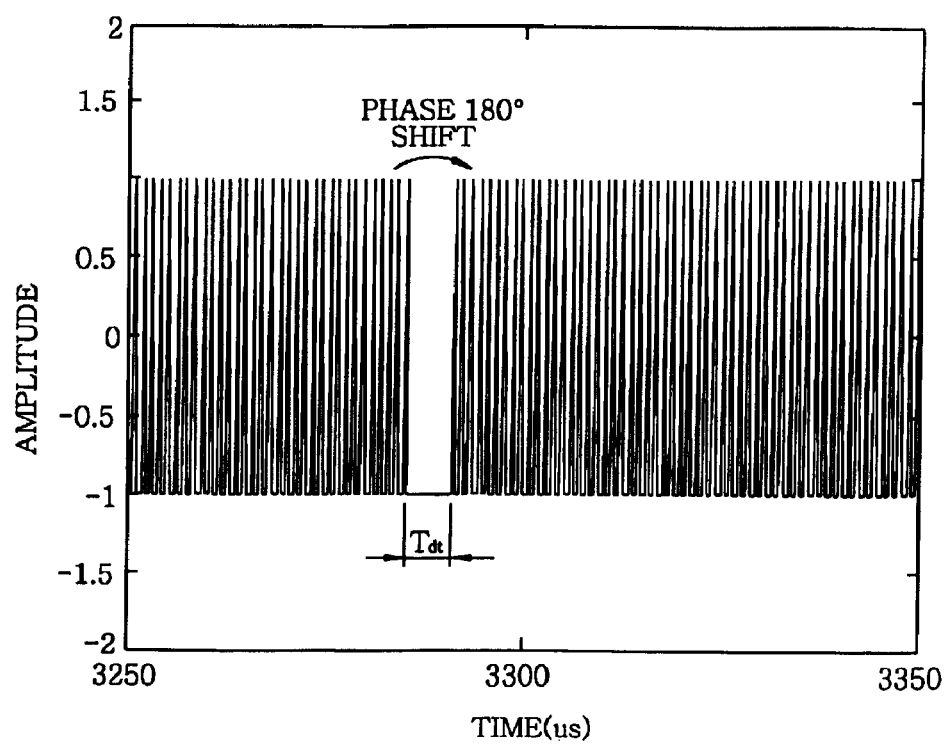
Figure 9:
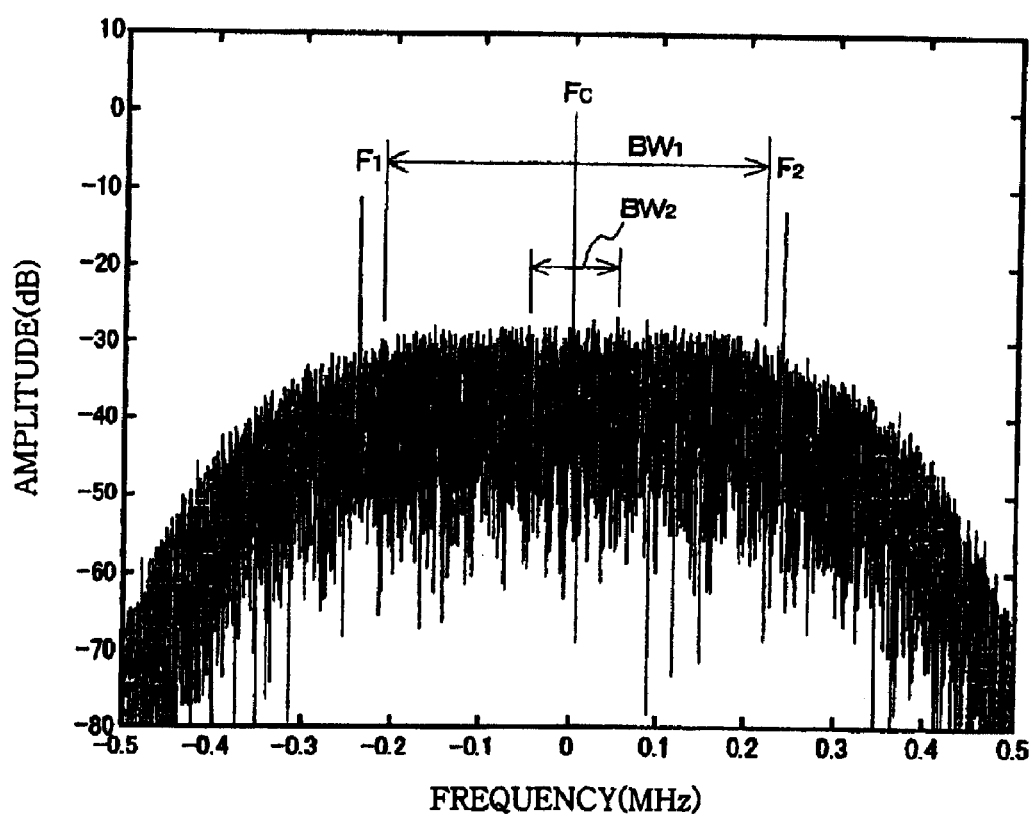
FIG. 9 provides a frequency spectrum of an output signal from a quadruple frequency multiplier shown in FIG. 7.

In FIG. 1, it may be contemplated to remove the multiplier 1, the BPF 2 and the frequency divider 4 to thereby directly input the carrier frequency of 10.7 MHz±22.5 kHz to the binary circuit 3. In this case, however, the BPF 5 performs the same function as that the BPF 2 on the QPSK modulated signal having the carrier frequency of 10.7 MHz±22.5 kHz and outputs the vector trace as shown in 10F. Therefore, the output signal of the BPF 5 will have the loss interval Tdt as shown in FIG. 8B. In order to avoid the loss interval Tdt, the bandwidth BW of the BPF 5 is then to be reduced down to ±22.5 kHz/3=±7.5 kHz to generate the vector trace as shown in FIG. 10B. However, in such a case, the carrier frequency deviation beyond ±7.5 kHz can not be detected.

In the preferred embodiment of the invention, however, the bandwidth BW of the BPF 5 can be set as ±25 kHz because the interval Tz due to zero vector and thus the loss interval Tdt are generated by the multiplier 1, the BPF 2 and the binary circuit 3 are interpolated by the frequency divider 4 and the BPF 5. The frequency divider 4, as described above, can reduce the phase change down to 45° before and after the loss interval Tdt.

Figure 6:
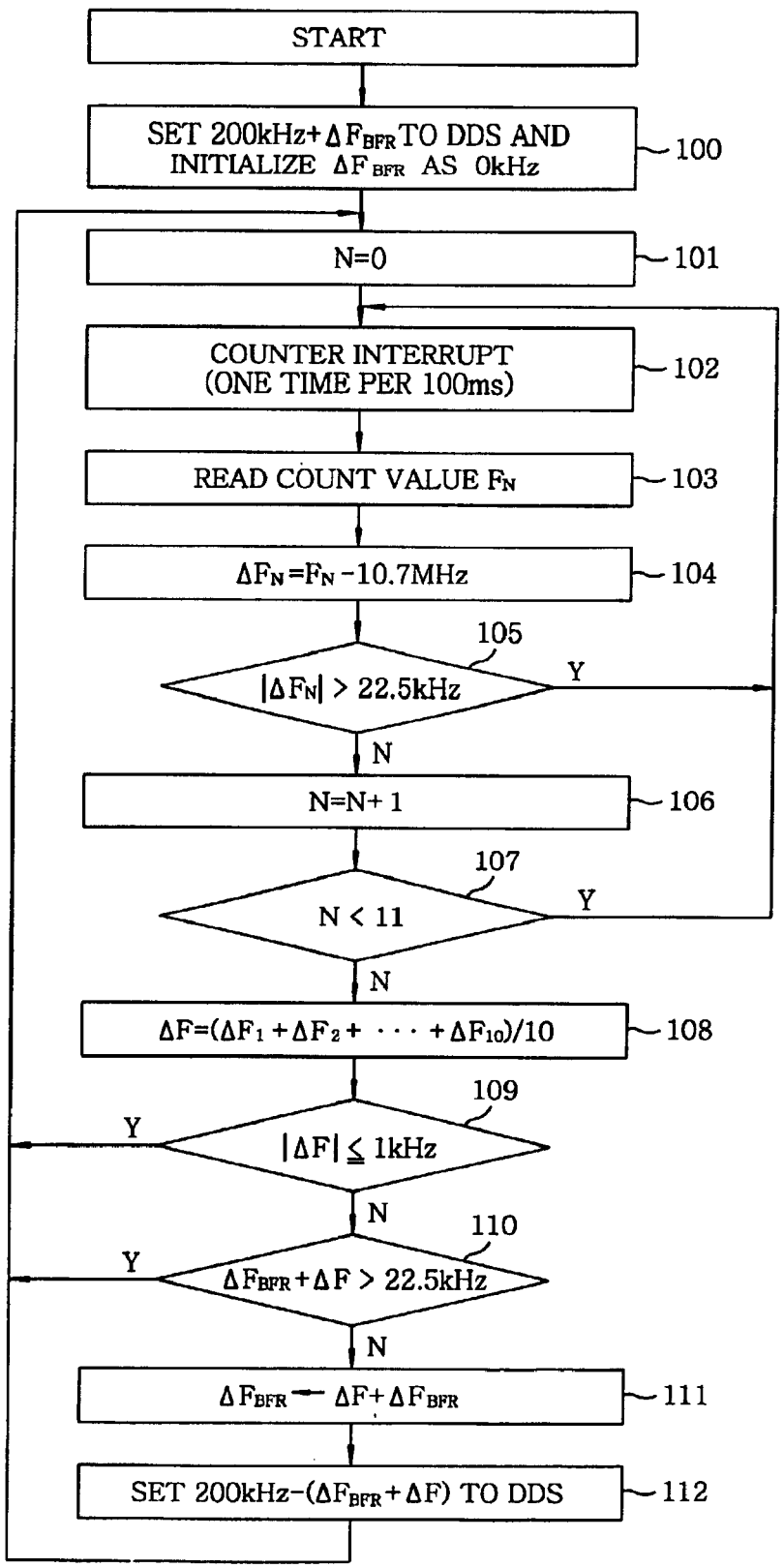
FIG. 6 presents a flow chart for a CPU operation.

The phase change of 45° before and after the loss interval Tdt also exists in the preferred embodiment of the invention, so that this can affect the count value of the frequency counter 30 by a certain degree. However, the effect of such the phase change can be mitigated by the averaging process of the count value described at steps 101 to 108 in FIG. 6.

Figure 4:
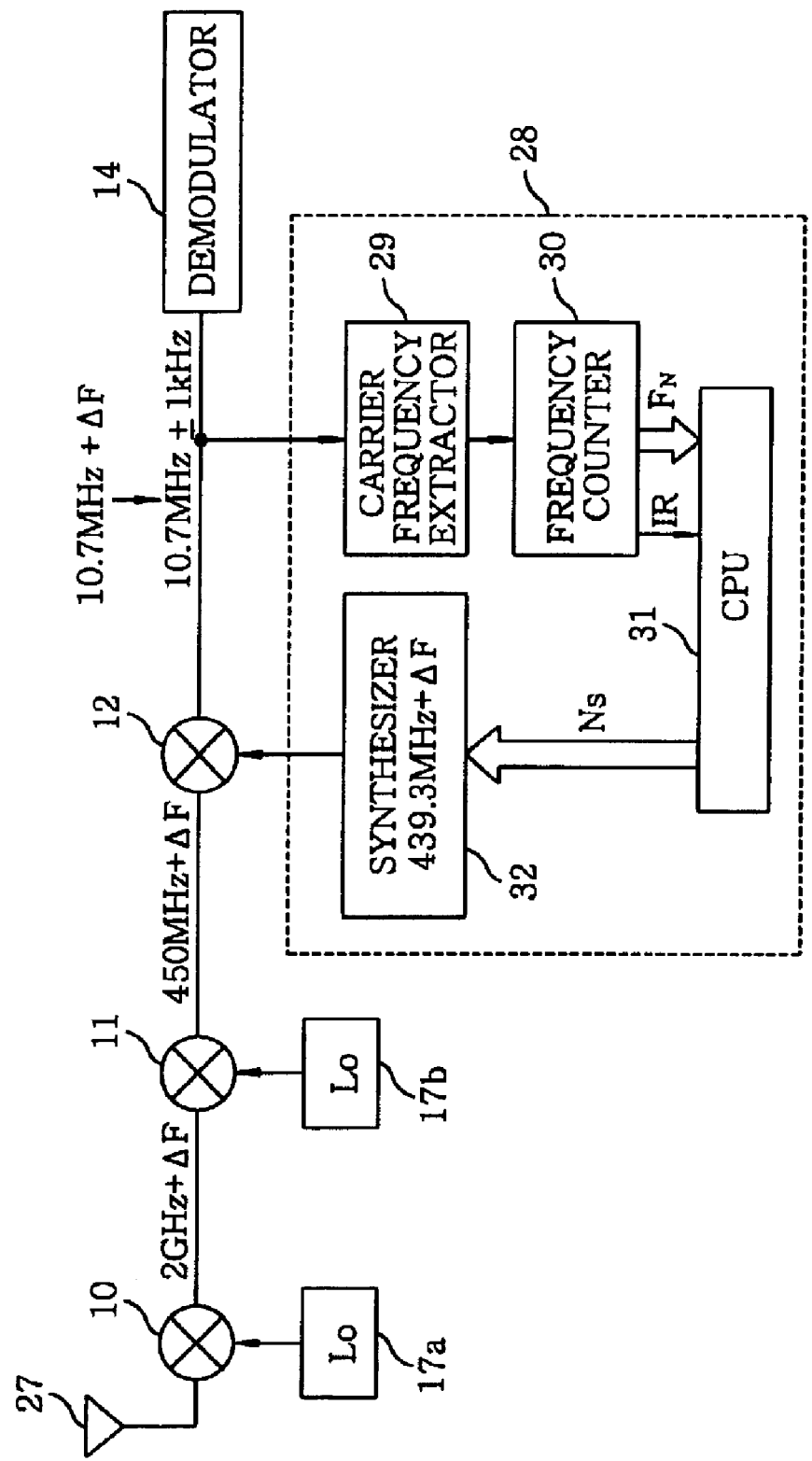
FIG. 4 provides a block diagram of a reception circuit of a transceiver incorporating therein an automatic frequency control circuit.
Figure 5:
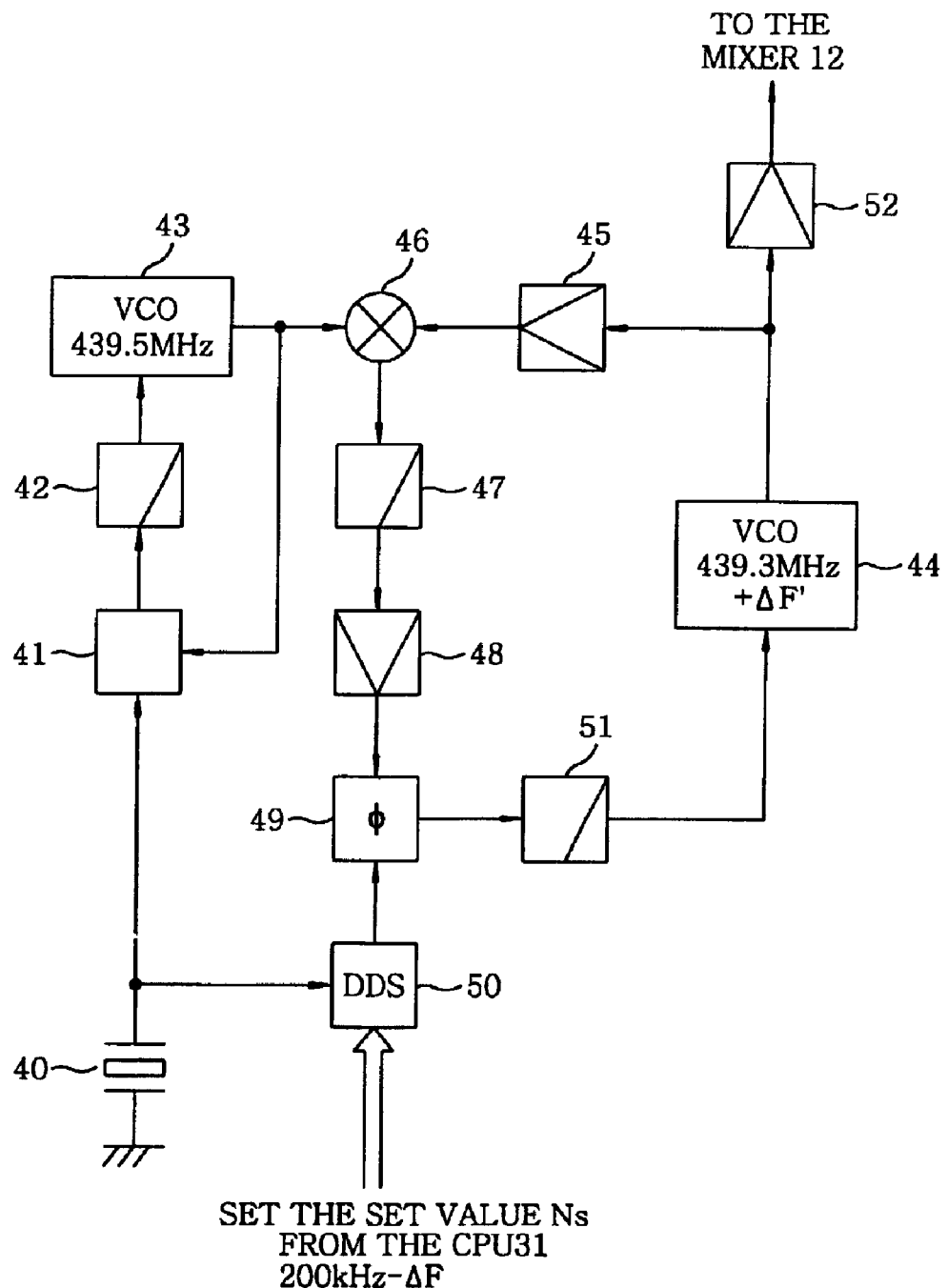
FIG. 5 represents a block diagram of a synthesizer shown in FIG. 4.

Even though the present invention has been described with respect to the specific embodiment, it should be apparent to those skilled in the art that the present invention is not limited thereto. For instance, the specific numbers in frequency can be properly adjusted depending on a carrier frequency and a deviation thereof. Further, the preferred embodiment of the invention can be employed in other circuit than the automatic frequency control circuit shown in FIG. 4. Also, the present invention can be applied in processing other types of modulation signals than the QPSK modulation signal described in the preferred embodiment.

Also, even though the present invention has been described with respect to the frequency multiplier 1 and the frequency divider 4 respectively having a multiplication and division factor of 4, such multiplication and division factors can be any identical positive number of N greater than 1. In such a case, the pass bandwidth of the BPF 2 is set to pass the maximum frequency deviation of a carrier and that of the BPF 5 is set to be slightly greater than 1/N of that of the BPF 2.

While the invention has been shown and described with respect to the preferred embodiments, it will be understood by those skilled in the art that various changes and modifications may be made without departing from the spirit and scope of the invention as defined in the following claims.

What is claimed is:

1. A frequency extractor for extracting an input frequency of an input signal, comprising:

a frequency multiplier for obtaining a signal of a multiplied frequency, the multiplied frequency being N times the input frequency, N being an integer greater than 1;

a first filter, having a first bandwidth, for filtering the signal of the multiplied frequency to provide a first filtered signal;

means for binarizing the first filtered signal to a binary signal;

a frequency divider for dividing the binary signal by a factor of N to provide a divided signal; and a second filter, having a second bandwidth, for filtering the divided signal to generate the input frequency in a form of a continuous wave, wherein the second bandwidth is about 1/N times the first bandwidth.

2. The frequency extractor of claim 1, wherein each of the first filter and the second filter is a band pass filter.

3. The frequency extractor of claim 1, wherein the N is 4.

4. The frequency extractor of claim 1, wherein the second bandwidth is wider than 1/N times the first bandwidth.

5. The frequency extractor of claim 1, wherein the input frequency of the input signal includes a carrier frequency of a modulated signal.

6. The frequency extractor of claim 5, wherein the carrier frequency is the sum of a target frequency and a frequency deviation $\Delta F$, $|\Delta F|$ being equal to or less than a predetermined value.

7. The frequency extractor of claim 6, wherein the first filter allows a signal of an N times multiplied carrier frequency to pass therethrough.

8. The frequency extractor of claim 7, wherein the second filter generates the carrier frequency in a continuous wave form.

9. The frequency extractor of claim 6, wherein the first bandwidth is not smaller than N times $|\Delta F|$.

10. The frequency extractor of claim 6, wherein the second bandwidth is not smaller than $|\Delta F|$.

* * * * *